Jan. 16, 1968  J. ONEY  3,363,359
ARTIFICIAL FISH LURE
Filed Aug. 2, 1965
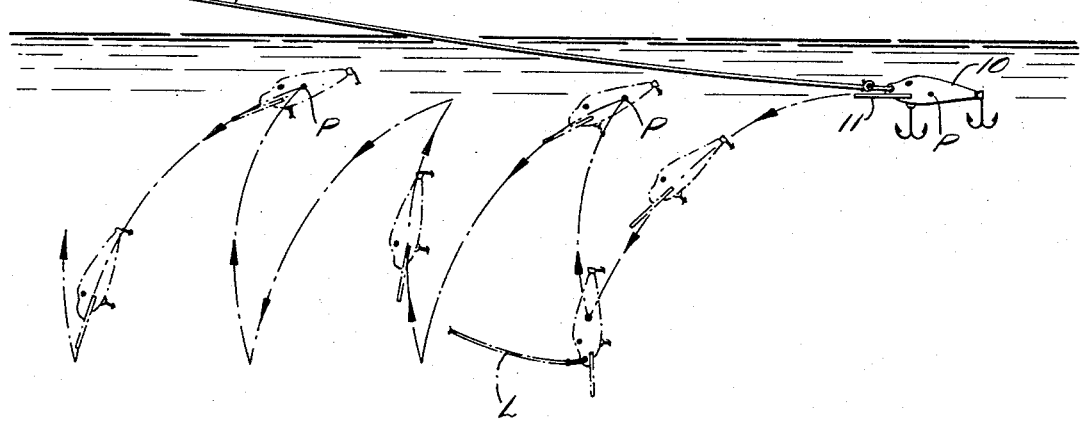
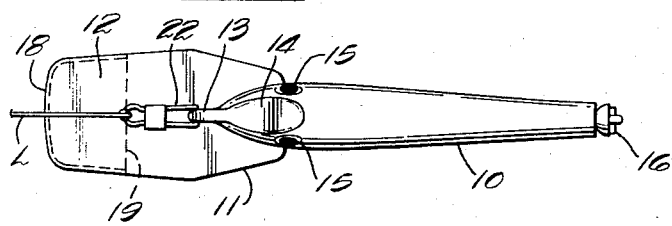
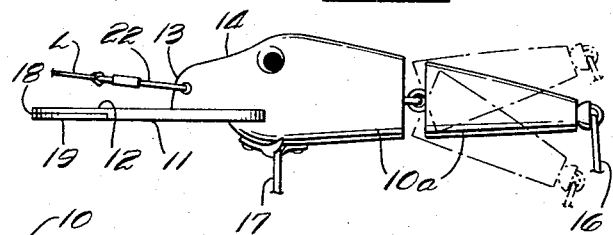
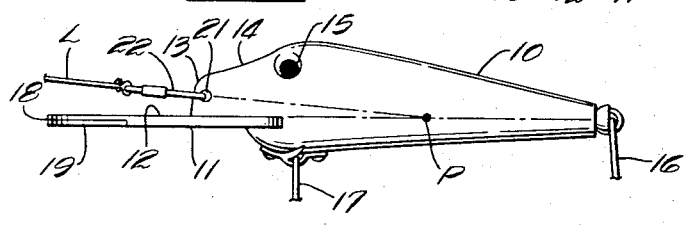
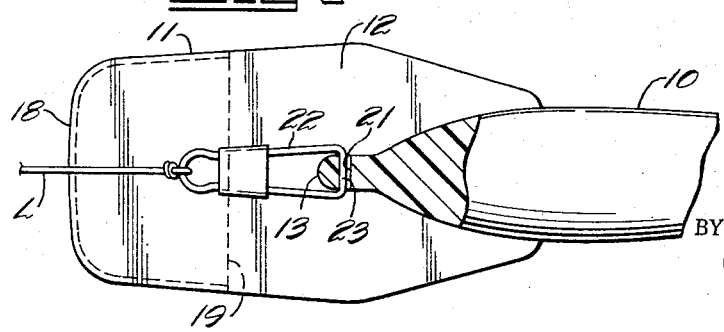
INVENTOR.
JOHN ONEY
BY William Cleland
ATTORNEY

United States Patent Office 3,363,359
Patented Jan. 16, 1968

3,363,359
ARTIFICIAL FISH LURE
John Oney, Akron, Ohio, assignor to Fred Arbogast Company, Inc., Akron, Ohio, a corporation of Ohio
Filed Aug. 2, 1965, Ser. No. 476,462
8 Claims. (Cl. 43—42.39)

ABSTRACT OF THE DISCLOSURE

Lure having flat head-plate extending forwardly of elongated body. Line attached to forward end of body above plate to have imaginary extension, in initial horizontal position of use of lure in water, intersecting plane through plate and body at focal point substantially rearwardly of point of line attachment. Weight distribution in water such that, with steady retrieve, water pressure variations cause lure to progress with succession of vertical zigzag darting movements.

---

This invention relates to artificial fish lures, and in particular to a fish lure of the under-water action type.

Heretofore, many lures of the general type described have been provided wherein water-deflecting head plates on bait bodies have been variously arranged and shaped to cause the body to descend in the water when retrieved on the end of a fishline, as well as to provide an erratic action intended to attract fish. In the prior art, however, the wobbling action referred to has always been laterally of the lures, and the differences, if any, in action of various lures has been in the degree or character of the lateral wobbling action.

An object of the present invention is to provide an underwater, artificial fish lure which when retrieved through the water, at the end of a fishline, will move with a series of vertical dives in a wave-like or undulating pattern, resembling a minnow or small fish darting downwardly after food.

Other objects of the invention will be manifest from the following brief description and the accompanying drawings.

Of the accompanying drawings:

FIGURE 1 is a top plan view of an artificial fish lure embodying the features of the invention.

FIGURE 2 is a side elevation of the same.

FIGURE 3 is an enlarged fragmentary plan view, party broken away and in section, corresponding to the front end of the lure, as shown in FIGURE 1.

FIGURE 4 is a diagrammatic view, on a reduced scale, illustrating the unique action of the lure in the water.

FIGURE 5 is a side elevation corresponding to FIGURE 2, illustrating a modified form of the invention.

Referring particularly to FIGURES 1 to 3, the improved fish lure may include an elongated body 10 of molded solid synthetic resin plastic, having a thin flat head plate 11 integrally affixed on the front or head end of the same. The top flat surface 12 of plate 11 lies substantially in a horizontal plane of the body which is below a longitudinal axis of the body so that a major portion of the same is presented above said horizontal plane. Body 10 tapers rearwardly almost to a point, and converges forwardly to a narrow snout 13, the forward portion of the body resembling the head of a small fish or a minnow, including a dished-head portion 14, and a pair of eyes 15, 15 which are substantially vertically aligned with the rear end of the head plate. As best shown in FIGURE 3, the head plate is approximately twice the width of the widest portion of the body, and tapers laterally inwardly from points about opposite the head end of the body, rearwardly to points at opposite sides of the body below the eyes 15. Gang hooks 16 and 17 are shown swivelly connected to the tapered rear end of the body and to the underside thereof near the head portion 14, respectively. A major top surface area of the head plate 11 is presented forwardly of the snout 13 and terminates in a straight or slightly arcuate forward edge 18, which may be protected against damage in use by a thin metal reinforcing plate 19 on the underside of the head plate which also, at least partially, serves as weight distributing means tending to set the lure upright in the water.

A small cylindrical aperture 21 extends laterally through the narrow snout portion 13, substantially in parallelism to said horizontal plane and at right angles to a vertical plane through the longitudinal axis of the body, and at a point spaced slightly above the head plate, as shown in FIGURE 2. A one-piece, keyhole-shaped, wire line fastener 22 may have a straight fulcruming portion 23 pivotally received through the aperture or eye 21, so that the lure body may swing in said vertical plane of the body for most effective use of the lure in the water, as will be described later. In any event, the weight distribution of the body 10, head plate 11, and the hook means 16 and 17, is such that when the lure is freely vertically supported on a fishline attached to said fastener 22 (see FIGURE 2), an imaginary extension of the line will intersect said horizontal plane of the body centrally of the latter, at a vector focal point P about midway of the length of body 10, and at a substantial distance rearwardly of the head plate. A suitable angle of said extension to the horizontal plane has been found to be on the order of six degrees, but this may vary to some extent depending on the action desired and on weight distribution factors.

In use of the lure described above for fishing, it is cast into the water and retrieved by reeling in the line L when the lure has dropped to requisite depth. The weight 19 acts initially to position the lure upright in the water as shown in solid lines in FIGURE 4, after which in so retrieving the line forwardly (see FIGURE 4), the lure quickly darts in a downwardly and forwardly arcuate path until the head plate is vertical, or almost vertical, so that the effective downward water pressure on the upper side of the head plate is relieved or reduced, whereby with continued steady forward and upward pull on the line the lure will just as quickly dart upward and backward in reverse arc. With such continued pull on the line this forward and reverse vertical darting movement is repeated as long as the line is being retrieved without interruption. Because the line L moves steadily forward, however, the lure also moves steadily forward in an undulating wave-like path, generally as indicated in full and broken lines in FIGURE 4. The vertical wave-like action of the lure is very much like that of a minnow or a small fish repeatedly darting or diving for food, sometimes to the point of touching and/or disturbing earth or other objects in the bottom of body of water being fished. In the latter instance the reinforcing plate 19 serves to prevent damage to the head plate 11.

Without the weight 19 on the head plate, the retrieved lure will have darting action as before and generally as shown in FIGURE 4, but in planes variously corresponding to the positions the lure initially assumes in the water before the retrieving action begins.

FIGURE 5 shows a modified form of the invention, which is in all respects the same as the lure described above, except that the lure body 10a is swivelly jointed at a point midway of the length thereof, and substantially corresponding to the aforesaid focal point P in FIGURE 2. The retrieving action of the lure 10a is otherwise substantially as described above and, accordingly, like parts are designated by like numbers unless otherwise noted.

Other modifications of the invention may be resorted to without departing from the spirit thereof or the scope of the appended claims.

What is claimed is:

1. An artificial under-water fish lure, comprising an elongated body having front and rear ends, a thin, substantially flat head plate affixed on the front end of said body to extend forwardly thereof in a first plane longitudinally through the body; apertured means of substantial axial extent at the forward end of said body, the axis of which extends laterally above said first plane in parallelism thereto and at right angles to a second plane longitudinally of the body and normal to said first plane; a line-fastening attachment having a pivotal portion received through said apertured means and on which the body is adapted to be supported for pivotal movement in said second plane; and fish-hook means on said body; the weight distribution of the body, head plate and fish-hook means being so disposed with respect to said axis that when the lure is freely suspended on a line secured to said attachment an imaginary extension of said line in said second plane will intersect the said first plane at a focal point rearwardly of said apertured means, whereby when the lure is drawn through the water by the line, water pressure variations against the top side of said head plate will cause the lure to progress forwardly through the water with a succession of vertical zig-zag darting movements.

2. A lure as in claim 1, a major portion of said body being presented above said first plane.

3. A lure as in claim 2, said head plate being substantially wider than the forward portion of said body and presenting a major top surface area of the head plate forwardly of the forward end of the body.

4. A lure as in claim 3, laterally opposite side edges of said head plate at the rear end thereof being inwardly convergent toward the sides of the body.

5. A lure as in claim 1, said pivotal portion including a straight cross-piece rotatably received in said apertured means, and opposite extensions of said pivotal portions embracing said forward end of the body to maintain said pivotal movement of the body in said second plane.

6. A lure as in claim 1, said head plate having counterbalancing weight means on the same, tending to position said body gravitationally upright in the water when the lure is cast therein at the end of the line.

7. A lure as in claim 1, the angle of said imaginary line extension to said first plane being on the order of six degrees and said focal point being generally centered intermediate the ends of the body.

8. A lure as in claim 1, a major portion of said body being presented above said first plane; and a major top surface portion of said head plate being presented forwardly of the forward end of the body.

References Cited

UNITED STATES PATENTS

| | | | |
|---|---|---|---|
| 1,540,702 | 6/1925 | Morris | 43—42.49 X |
| 2,179,641 | 11/1939 | Layfield | 43—42.39 |
| 2,425,272 | 8/1947 | Walker et al. | 43—42.47 |
| 2,627,136 | 2/1953 | Sinclair | 43—42.47 |

FOREIGN PATENTS

| | | |
|---|---|---|
| 458,710 | 8/1949 | Canada. |

SAMUEL KOREN, *Primary Examiner.*

D. J. LEACH, *Assistant Examiner.*